United States Patent
Kolokowsky

(10) Patent No.: US 7,069,347 B1
(45) Date of Patent: Jun. 27, 2006

(54) DEVICE AND METHOD FOR ADAPTING SPEED OF A USB DEVICE BASED ON AVAILABLE POWER

(75) Inventor: Stephen H. Kolokowsky, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 10/260,081

(22) Filed: Sep. 27, 2002

(51) Int. Cl.
*G06F 13/10* (2006.01)

(52) U.S. Cl. ............... 710/8; 710/10; 710/14; 710/62; 710/72; 713/1; 713/100

(58) Field of Classification Search ............. 710/8, 710/10, 14–17, 62, 72, 300–302, 60, 104; 713/100, 300, 320, 340, 1, 322
See application file for complete search history.

(56) References Cited

U.S. PATENT DOCUMENTS

| | | | | |
|---|---|---|---|---|
| 5,675,813 A | * | 10/1997 | Holmdahl | 713/310 |
| 5,974,486 A | * | 10/1999 | Siddappa | 710/53 |
| 5,987,617 A | * | 11/1999 | Hu et al. | 713/320 |
| 6,012,103 A | | 1/2000 | Sartore et al. | |
| 6,178,514 B1 | | 1/2001 | Wood | |
| 6,611,552 B1 | * | 8/2003 | Beck | 375/219 |
| 6,665,801 B1 | * | 12/2003 | Weiss | 713/300 |
| 6,665,810 B1 | * | 12/2003 | Sakai | 713/600 |
| 6,738,834 B1 | * | 5/2004 | Williams et al. | 710/8 |
| 6,839,778 B1 | * | 1/2005 | Sartore et al. | 710/60 |
| 2002/0162035 A1 | * | 10/2002 | Tsukihashi | 713/300 |
| 2002/0162036 A1 | * | 10/2002 | Kim et al. | 713/300 |
| 2003/0054703 A1 | * | 3/2003 | Fischer et al. | 439/894 |
| 2003/0110403 A1 | * | 6/2003 | Crutchfield et al. | 713/300 |
| 2004/0221180 A1 | | 11/2004 | Enami et al. | |

FOREIGN PATENT DOCUMENTS

JP  2002-202856 A  *  7/2002

OTHER PUBLICATIONS

New Release, Intel Corporation, "Intel Releases USB 2.0 Enhanced Host Controller Interface 1.0 Specification, EHCI Compliance–Testing Program", Intel Developer Forum, Tokyo, Apr. 17, 2002, 2 pages.

* cited by examiner

*Primary Examiner*—Ilwoo Park
(74) *Attorney, Agent, or Firm*—Dorsey & Whitney LLP

(57) ABSTRACT

Disclosed herein is a device and method for adapting an operating speed of a USB peripheral device coupled with a host. In one example, the peripheral device is initially operated at a first operating speed associated with a first power consumption level, and it is determined whether the host will support the peripheral device operating at a second, higher power consumption level. If so, the peripheral device is reconfigured to operate at a second operating speed associated with the second power consumption level. In one example, the peripheral device may be initially operated at an operating speed of approximately 12 Mbps (i.e., full speed USB) so that the peripheral device draws no more than approximately 100 mA of current. In this example, the peripheral device may report a high power descriptor set including a 100 to 500 mA descriptor, and if the host selects the descriptor set, then the peripheral device is can reconfigure itself to operate with an operating speed of approximately 480 Mbps (i.e., high speed USB) so that the peripheral device draws approximately 100 to 500 mA of current. In this manner, the peripheral device can selectively operate in high speed USB mode if the host (or hub) can provide the current needed by the peripheral device to operate at the faster data rates of the high speed USB mode. If not, the peripheral device operates in the full speed USB mode.

14 Claims, 3 Drawing Sheets

DEVICE AND METHOD FOR ADAPTING SPEED OF A USB DEVICE BASED ON AVAILABLE POWER

TECHNICAL FIELD

This application relates, in general, to power management of USB peripheral devices.

BACKGROUND

The universal serial bus (USB) provides a low cost solution for attaching peripheral devices to a host, such as a host computer or host server, so that the peripheral devices and the host can communicate with each other. Devices that are attached to a USB bus are automatically detected and software automatically 11 configures the devices for immediate use, typically without user intervention. The USB devices/peripherals may include devices such as printers, scanners, keyboards, a mouse, digital cameras, digital video cameras, data acquisition devices, modems, speakers, telephones or video phones, storage devices such as ZIP drives, or other peripherals or devices. A USB bus can be extended with a hub which permits additions peripherals, or other hubs, to be coupled to a USB bus.

The USB specification entitled "Universal Serial Bus Revision 2.0 Specification" available at www.usb.org, the disclosure of which is hereby incorporated by reference in its entirety, dictates various requirements and protocols for devices connected with a USB bus—such as issues relating to power management.

Typically, a USB bus may include a peripheral device connected by a USB cable to a host or hub. By convention, data transmitted in the direction of the peripheral device is said to be in the "downstream" direction, while data transmitted in the direction of the host is said to be in the "upstream" direction.

One of the benefits of USB is the combination of power lines and signal lines in a single USB cable, which can eliminate the need for extra wires for an external power supply. Devices that draw power from the USB bus are called bus-powered devices.

As shown in FIG. 1, a host or hub 20 is coupled with a peripheral 22 over a USB cable 24. As provided by the USB specification, the USB cable 24 has four wires therein, two wires devoted to data signals D+ and D−, and two wires (Vbus and Gnd) devoted to supplying power to the peripherals within certain ranges. Under the USB specification, if any peripheral requires more than 500 milliamps (mA) for operation, then it must have its own power supply.

As specified by the USB specification, a peripheral may draw all of its power from the USB bus wiring if the peripheral draws up to, but no more than, 100 mA. If a peripheral requires a more than 100 mA but less than 500 mA, the peripheral can draw its power from the USB bus if during initialization, system configuration or enumeration, the peripheral consumes less than 100 mA.

USB supports three speeds of operation, high-speed USB supporting 480 Mbps (Mbps) data rates, full speed USB supporting data rates of 12 Mbps, and low speed USB supporting data rates of 1.5 Mbps. In general, high-speed USB devices consume greater amounts of power than low speed USB devices. In fact, there are many USB devices which cannot enumerate or initialize in high speed mode using less than 100 mA because their high speed transceivers increase power consumption over 100 mA, and therefore these devices have difficulties conforming to the USB specification.

Accordingly, as recognized by the present inventor, what is needed is a method for permitting a high speed USB device that draws more than 100 mA to be attached to a hub or host so that the USB device may draw its power from the USB bus wires.

It is against this background that various embodiments of the present invention were developed.

SUMMARY

According to one broad aspect of one embodiment of the present invention, disclosed herein is a method for adapting an operating speed of a USB peripheral device adapted to be coupled with a host. In one example, the method includes initially operating the peripheral device at a first operating speed associated with a first power consumption level; determining whether the host will permit the peripheral device to operate at a second power consumption level, the second power consumption level being higher than the first power consumption level; and reconfiguring the peripheral device to operate at a second operating speed associated with the second power consumption level, the second operating speed being higher than the first operating speed.

In one example, the peripheral device may be initially operated at an operating speed of approximately 12 Mbps (i.e., full speed USB) so that the peripheral device draws no more than approximately 100 mA of current. In this example, the peripheral device may report a descriptor set including a high power descriptor (such as 100–500 mA), and if the host selects the high power descriptor set, then the peripheral device is can reconfigure itself to operate with an operating speed of approximately 480 Mbps (i.e., high speed USB) so that the peripheral device may draw approximately 100 to 500 mA of current. In one example, if the host cannot support the peripheral device operating at the second power consumption level, then the peripheral device is operated at the first operating speed associated with the first power consumption level.

In this manner, the peripheral device can selectively operate in high speed USB mode if the host (or hub) can provide the current needed by the peripheral device to operate at the faster data rates of the high speed USB mode. If not, the peripheral device may operate in the full speed USB mode.

According to another broad aspect of another embodiment of the invention, disclosed herein is a device for coupling with a host. In one example, the device includes a module for selectively operating the device at a first or second operating speed depending on whether the host can supply a requested power consumption level to the device. The module initially operates the device at the first operating speed associated with a first power consumption level. The first operating speed may be approximately 12 Mbps and the first power consumption level may be approximately 100 mA or less of current. The second operating speed may be approximately 480 Mbps and the requested power consumption level may be approximately 100 to 500 mA of current.

In one embodiment, the module determines whether the host can supply the requested power level to the device being higher than the first power consumption level, and if so, the module reconfigures the device to operate at a second operating speed associated with the requested power consumption level, the second operating speed being higher than the first operating speed. In one example, the module reports the device as having a descriptor set including a high power descriptor (such as a 100 to 500 mA descriptor), and the module determines if the host selects the descriptor set.

If the host cannot supply the requested power consumption level to the device, the module operates the device at the first operating speed associated with the first power consumption level.

According to another broad aspect of another embodiment of the invention, disclosed herein is a device for coupling with a host. In one example, the device includes a first mode of operation including a first operating speed and a first power consumption level; a second mode of operation including a second operating speed and a second power consumption level; and a module for selecting whether the device operates using the first mode or the second mode, the module selecting based in part on whether the host permits the device to operate at the second power consumption level. In one example, the first operating speed may be approximately 12 Mbps; the second operating speed may be approximately 480 Mbps; first power consumption level may be approximately 100 mA or less; and the second power consumption level may be approximately 100 to 500 mA. In one embodiment, the module may report the device as having a descriptor set including a high power descriptor, such as a 100 to 500 mA descriptor, and the module determines if the host selects the descriptor set.

The foregoing and other features, utilities and advantages of the invention will be apparent from the following more particular description of various embodiments of the invention as illustrated in the accompanying drawings and claims.

DETAILED DESCRIPTION

Disclosed herein is a device and method for adapting an operating speed of a USB peripheral device coupled with a host. In one example, the peripheral device is initially operated at a first operating speed associated with a first power consumption level, and it is determined whether the host will permit the peripheral device to operate at a second, higher power consumption level. If so, the peripheral device is reconfigured to operate at a second operating speed associated with the second power consumption level. In one example, the device reconfigures itself by simulating a disconnection from the USB bus and then reconnecting to the bus and enumerating as a high speed device. In this manner, the peripheral device can selectively operate in a high speed USB mode if the host (or hub) will provide the current needed by the peripheral device to operate at the faster data rates of the high speed USB mode. If not, the peripheral device operates in the full speed USB mode. Various embodiments of the present invention will now be discussed.

Figure 1:
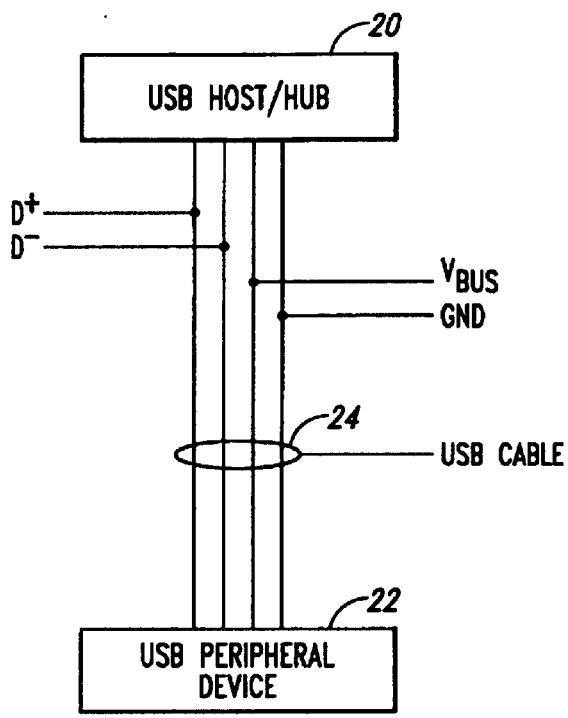
FIG. 1 illustrates a block diagram of a USB host, a USB peripheral device, and a USB cable.
Figure 2:
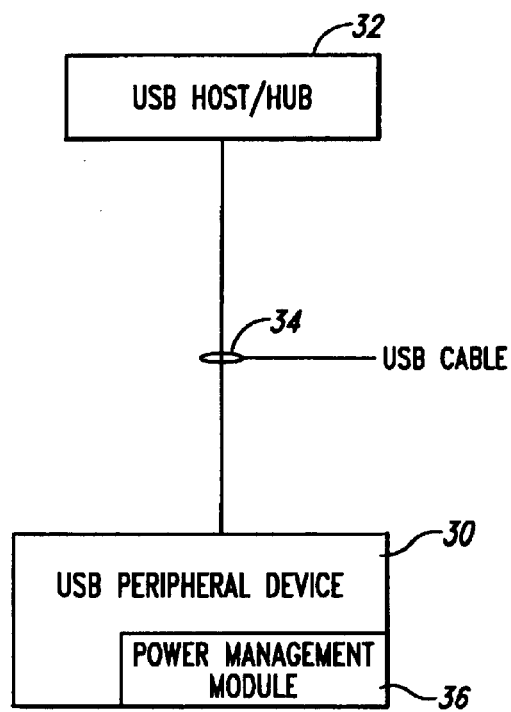
FIG. 2 illustrates a block diagram of a USB peripheral device having a power management module, in accordance with one embodiment of the present invention.

Referring to FIG. 2, a USB peripheral device 30 is coupled with a USB host or hub 32 over a USB cable 34. In accordance with one embodiment of the present invention, the device 30 derives its power from the host or hub 32 through cable 34, and the device 30 includes a power management module 36.

In accordance with an embodiment of the present invention, the power management module 36 may include one or more operations for adapting the operating speed and power consumption of the device 30, depending on how much power the host or hub 32 can support (i.e., how much power the host will permit the device to draw). These operations may include one or more of the operations described herein including with reference to FIG. 3 and/or FIG. 4.

In one example, the device 30 supports both high speed and a full speed modes of USB operations, and the power management module 36 determines whether the device 30 should operate in high-speed or full speed mode.

When the USB device 30 is attached to a USB bus 34, the host 32 uses a process known as bus enumeration to identify and manage the device 30. Per the USB protocol, when the device 30 is connected with the USB bus, the host 32 generates a "get configuration" message, along with other messages, to which the peripheral device 30 responds with a configuration message which may include descriptors containing information about the peripheral device 30.

USB device 30 may report its attributes to host 32 using descriptors. A descriptor is a data structure with a defined format and includes a plurality of fields indicating characteristics of a USB device 30. Within USB, there are various types of descriptors, including a device descriptor that describes general information about a USB device, and a configuration descriptor which describes information about a particular device configuration.

During device enumeration, the host 32 evaluates the power requirements of device 30. If the power requirements of a particular configuration of device 30 exceed the power available to the device 30 from the host 32, the host 32 does not select that configuration. With regard to the configuration descriptor, a field of "bMaxPower" contains a number which the device can set to specify the maximum power consumption of the device 30 from the bus in this specific configuration. In one embodiment, this field is set to a high power descriptor value such as between 100 to 500 mA initially (even though the device is actually drawing 100 mA or less) in order to determine if the host or hub 32 is capable of supporting high power/high-speed operations of the peripheral device 30. If the host 32 to is able to support the power and bandwidth specified by the peripheral device 30 in its configuration message, the host 32 responds with a message indicating that the peripheral device 30 may be connected with the USB bus. The device 30 may then disconnect itself from the bus (or simulate such a disconnection) so that the host sees the device 30 as a new device coupled with the bus, and the device 30 enumerates itself as a high speed, high current device.

In one example, upon initialization, the module 36 makes an initial connection to the USB cable 24 in a first operating mode at a first operating speed, such as full speed USB, at a first power consumption level such as 100 mA. The module 36 may report the peripheral device 30 as having a descriptor set including a set of descriptors that require 500 mA. If the host 32 selects the 500 mA descriptor set, then the device 30 learns that the host 32 can support a high speed mode of operation. In one embodiment, the device 32 then disconnects from the bus 24 and reconnects as operating in a second operating mode at a second operating speed (i.e., High Speed USB), and therefore may draw up to 500 mA of current from the host 32 through cable 34. If the host 32 does not select the 500 mA descriptor set, then the module 36 is aware of the fact that the host 32 is unable to support the higher power/current requirements associated with high speed operating modes, and therefore the module 36 maintains the device 30 operating at the full speed operating mode.

Figure 3:
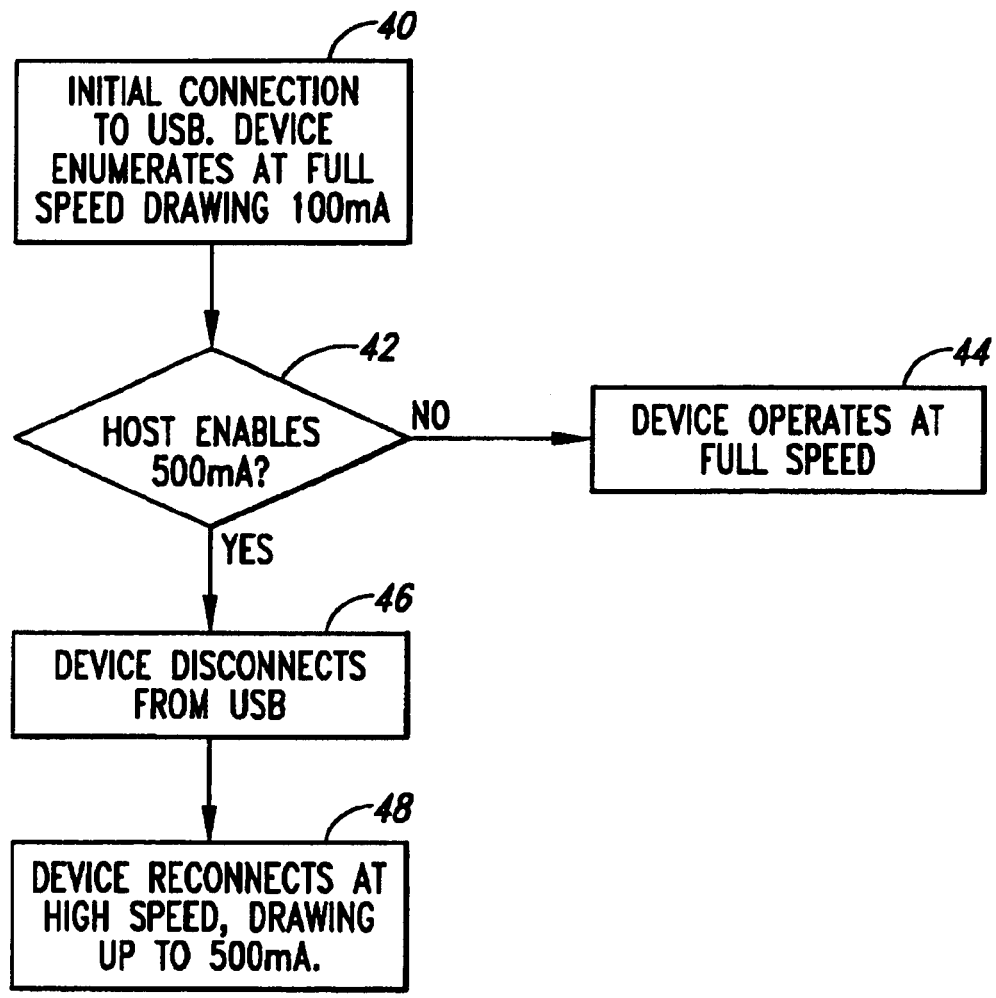
FIG. 3 illustrates an example of logical operations for initializing a USB device, in accordance with one embodiment of the present invention.

Referring to FIG. 3, one example of the logical operations for adapting the operating speed of a USB device is illustrated, in accordance with one embodiment of the present invention.

At operation 40, an initial connection is made between a USB device and a USB hub or host. In one example, the device enumerates itself at full speed, drawing no more than 100 mA of current. The device may present the host with a set of high power descriptors such as 100 to 500 mA of current, for example. At operation 42, if the host does not selects this high power descriptor set, then the device is aware of the fact that the host is unwilling to support the requested high power consumption level, and accordingly, at operation 44, the device continues to operate at full speed, preferably drawing no more than 100 mA of current.

If, at operation 42, the host selects the high power descriptor set (i.e., 100 to 500 mA), then the device is aware of the fact that the host will support the requested high power consumption level, and in one example, at operation 46, the device disconnects from the USB bus. At operation 48, the device reconnects to the USB bus. In one example, operations 46–48 are performed by the device simulating a disconnection from the USB bus by effecting a momentary open circuit on a pull up resistor which the device has tied to the D+data line, which signals to the host that a new device is connected to the bus.

Upon reconnection, the device enumerates in a high speed mode, and because the host had previously enabled a high power descriptor set at operation 42, the device at operation 48 may operates and consume power of between approximately 100 to 500 mA of current, in one example.

Figure 4:
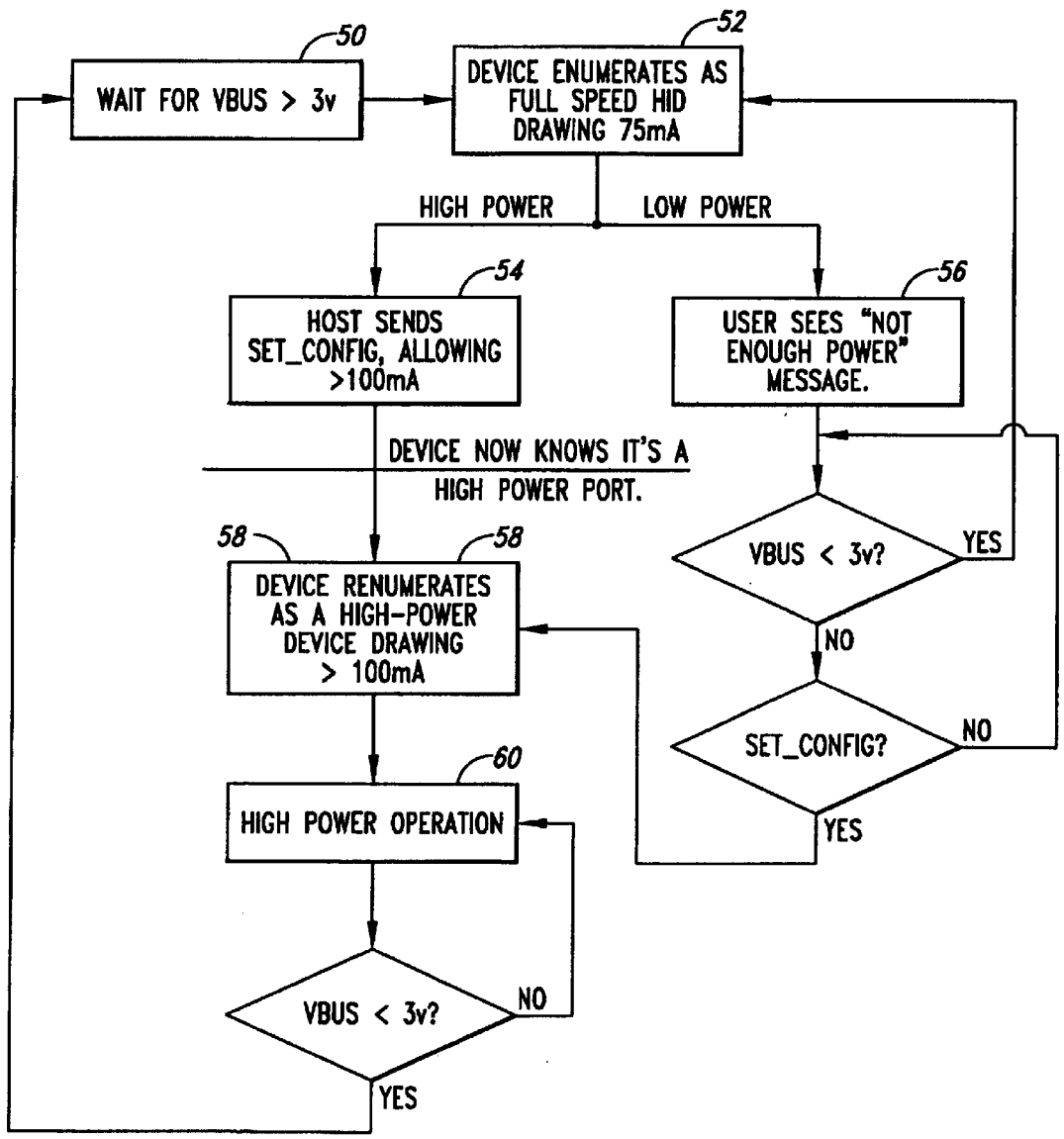
FIG. 4 illustrates an example of logical operations of an alternative embodiment of the present invention.

FIG. 4 illustrates an example of logical operations for an alternative embodiment of the present invention. In this example, it is assumed that a peripheral device according to the present invention is going to be coupled with a port of a host, although the same operations could be used for coupling the device to a hub. Generally, in this embodiment, the device starts as a full speed device drawing less than 100 mA of current when connected with the bus. During the enumeration process, the host will ask the device for its configuration, which contains the power draw of that configuration. Preferably, the device reports a configuration which includes a power level of greater than 100 mA but preferably less than 500 mA, which in effect requests whether the host can support a power level of greater than 100 mA. When the host determines that it has enough power to supply this configuration, the host sends a SET_CONFIGURATION message to the device. At this point, the device knows that it is connected to a high-power port. The device waits for enumeration to complete, then the device performs a re-enumeration operation wherein the device simulates a disconnection from the bus and then comes back on the bus as a high-power, high-speed device (i.e., a bulk loopback device), in one example.

Referring to FIG. 4, at operation 50, in one example, the device waits for the bus voltage to exceed approximately 3 volts before passing control to operation 52. At operation 52, on power-up, the device enumerates as a full speed device drawing less than 100 mA. Preferably, during power-up, the device may be set to operate in a low power mode, such as with its CPU running at a low clock speed and with general-purpose interfaces disabled so as to reduce current consumption.

At operation 52, the device may send configuration descriptors to the host indicating that the device will need more than 100 mA to operate (for example, the device requests 500 mA). At operation 54, if the device is connected to a high-power port, the host will send a SET_CONFIGURATION message to select the high-power configuration.

However, if the device is connected to a low-power port, at operation, 56 the host will not send a SET_CONFIGURATION message, and the device therefore continues to operate in low-power mode at full speed, for example. In one example, the operating system may display a message to the user requesting that the user plug the device into a high-power port. The device may remain in this state until the bus voltage is removed from the device (due to, for example, an unplug or replug or a power state change). If, for instance, the device sees its bus voltage connection drop below approximately 3 volts, for example, indicating an unplug of the device, then control may be returned to operation 52. Or if the device receives a SET_CONFIGURATION message, control may be passed to operation 58.

At operation 58, if the device receives the SET_CONFIGURATION message, the device knows that it is connected to a high-power port. In one example, the device disconnects from the USB bus and reconnects to the bus, enumerating this time as a high-speed device. At operation 60, the device continues to operate as a high-speed, high-power device until the bus voltage is removed. When the bus voltage is removed (i.e., drops below approximately 3 volts for example), the device returns control to operation 50, in one example.

Accordingly, it can be seen that the operations of FIG. 4 allow a device to dynamically configure its speed of operation based upon the amount of available power which the device is permitted to draw from the USB bus.

Various embodiments of the present invention permit a USB peripheral device to operate in either a high speed mode or a full speed mode, depending upon the amount of power that a host or hub can provide to the peripheral device. Through the use of one or more embodiments of the present invention, USB devices such as memory card readers, video cameras, MP3 players, scanners, and other high-speed USB devices can operate in either a high speed mode or a full speed mode, depending upon the amount of power that the associated host or hub can supply.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to a preferred embodiment thereof, it will be understood by those skilled in the art that various other changes in the form and details may be made without departing from the spirit and scope of the invention.

I claim:

1. A method for adapting an operating speed of a USB peripheral device adapted to be coupled with a host, comprising:

providing for initially connecting the peripheral device to the host;

providing for, upon initial connection of the peripheral device to the host, initially operating the peripheral device at a first operating speed of full speed USB associated with a first power consumption level;

providing for determining whether the host can support the peripheral device operating at a second power consumption level, said second power consumption level being higher than said first power consumption level, said providing for determining operation further comprising:

providing for reporting the peripheral device as having a descriptor set including a high power descriptor; and providing for determining if the host selects the high power descriptor;

providing for reconfiguring the peripheral device, if the host selects the high power descriptor, to operate at a second operating speed of high speed USB associated with the second power consumption level, the second operating speed being higher than the first operating speed; and providing for operating the peripheral device at the first operating speed of full speed USB associated with the first power consumption level if the host does not select the high power descriptor.

2. The method of claim 1, wherein the operation of providing for initially operating further comprises:

providing for operating the peripheral device at an operating speed of approximately 12 Mega bits per second (Mbps) so that the peripheral device draws no more than approximately 100 milliamps (mA) of current.

3. The method of claim 1, wherein the operation of providing for reconfiguring the peripheral device further comprises:

providing for operating the peripheral device at an operating speed of approximately 480 Mbps so that the peripheral device can draw approximately 100 to 500 mA of current.

4. The method of claim 1, wherein the first operating speed is approximately 12 Mbps, the second operating speed is approximately 480 Mbps.

5. The method of claim 1, wherein the first power consumption level is approximately 100 mA, and the second power consumption level is approximately 100 to 500 mA.

6. The method of claim 1, wherein the operation of providing for reconfiguring further comprises:

providing for simulating a disconnection of the peripheral device from a USB bus.

7. A USB device for coupling with a host, comprising:

a module for selectively operating the device at a first or second operating speed depending on whether the host will permit the device to draw a requested power consumption level, the module initially operating the device at the first operating speed of full speed USB associated with a first power consumption level when the device is initially coupled with the host, wherein the module determines whether the host will permit the device to draw the requested power consumption level being higher than said first power consumption level, by reporting the device as having a descriptor set including a 100 to 500 mA descriptor, and the module determines if the host selects the descriptor set;

wherein if the host selects the descriptor set, the module reconfigures the device, by simulating a disconnection to the host, to operate at a second operating speed of high speed USB associated with the requested power consumption level; and wherein if the host did not select the descriptor set, the module operates the device at the first operating speed of full speed USB associated with the first power consumption level.

8. The device of claim 7, wherein the first operating speed is approximately 12 Mbps and the first power consumption level is approximately 100 mA of current.

9. The device of claim 7, wherein the second operating speed is approximately 480 Mbps and the requested power consumption level is approximately 100 to 500 mA of current.

10. The device of claim 7, wherein the first operating speed is approximately 12 Mbps, the second operating speed is approximately 480 Mbps.

11. The device of claim 7, wherein the requested power consumption level is approximately 500 mA.

12. A device for coupling with a host, comprising:

a first mode of operation including a first operating speed of full speed USB and a first power consumption level;

a second mode of operation including a second operating speed of high speed USB and a second power consumption level; and a module for selecting whether the device operates using the first mode or the second mode, the module selecting based in part on whether the host permits the device to operate at the second power consumption level;

wherein the module initially operates the device at the first operating speed of full speed USB when the device is initially coupled with the host, wherein the module determines whether the host will permit the device to draw the requested power consumption level being higher than said first power consumption level, by reporting the device as having a descriptor set including a 100 to 500 mA descriptor, and the module determines if the host selects the descriptor set;

wherein if the host selects the descriptor set, the module reconfigures the device, by simulating a disconnection to the host, to operate at a second operating speed of high speed USB associated with the requested power consumption level; and wherein if the host did not select the descriptor set, the module operates the device at the first operating speed of full speed USB associated with the first power consumption level.

13. The device of claim 12, wherein the first operating speed is approximately 12 Mbps, the second operating speed is approximately 480 Mbps.

14. The device of claim 12, wherein the first power consumption level is approximately 100 mA or less, and the second power consumption level is approximately 100 to 500 mA.

* * * * *